ative. The center to edge is arranged at a small slope to provide rain runoff. The perimeter of the area is surrounded by a deep concrete wall and gravel-filled moat to catch the runoff water. The runoff water forms a perimeter seal that provides clean ground water to the radial area surrounding the covered area, and seals in the pollution below it.

United States Patent [19]
Marks

[11] Patent Number: 4,618,284
[45] Date of Patent: Oct. 21, 1986

[54] DEVICE AND METHOD FOR THE RECLAMATION OF POLLUTED LAND AREAS

[76] Inventor: Alvin M. Marks, Bigelow Rd., Athol, Mass. 01331

[21] Appl. No.: 613,799

[22] Filed: May 24, 1984

[51] Int. Cl.⁴ ............................ B65G 5/00; G21F 9/24
[52] U.S. Cl. ...................................... 405/129; 405/53; 405/267
[58] Field of Search ....................... 405/19, 20, 36, 53, 405/55, 56, 57, 63, 65, 128, 129, 270, 107, 109, 267; 210/170

[56] References Cited

U.S. PATENT DOCUMENTS

| | | | |
|---|---|---|---|
| 3,323,309 | 6/1967 | Dobell | 405/267 X |
| 3,504,496 | 4/1970 | Hnot | 405/53 |
| 3,592,009 | 7/1971 | Glijnis et al. | 405/53 |
| 3,736,754 | 6/1973 | Azalbert et al. | 405/53 |
| 3,782,124 | 1/1974 | Pladys | 405/53 |
| 3,922,823 | 12/1975 | King et al. | 405/53 X |
| 3,925,991 | 12/1975 | Poche | 405/65 |
| 3,943,721 | 3/1976 | Azalbert et al. | 405/53 X |
| 4,252,462 | 2/1981 | Klingle et al. | 210/170 X |
| 4,326,818 | 4/1982 | Willis | 405/270 X |
| 4,452,548 | 6/1984 | Balogh et al. | 405/128 X |
| 4,464,081 | 8/1984 | Hillier et al. | 405/128 |

FOREIGN PATENT DOCUMENTS

| | | | |
|---|---|---|---|
| 33618 | 2/1983 | Japan | 405/129 |
| 7614423 | 7/1977 | Netherlands | 405/129 |
| 13780 | 12/1928 | United Kingdom | 405/53 |

Primary Examiner—Cornelius J. Husar
Assistant Examiner—Nancy J. Stodola

[57] ABSTRACT

There is described a prefabricated floating raft of low density modules, which are trucked into the polluted land site, and lifted into place over the polluted land area. The surface is sealed with an impervious plastic cover, and a thin layer of gravel and top soil is placed on top, with grass or other suitable vegetation. The center to edge is arranged at a small slope to provide rain runoff. The perimeter of the area is surrounded by a deep concrete wall and gravel-filled moat to catch the runoff water. The runoff water forms a perimeter seal that provides clean ground water to the radial area surrounding the covered area, and seals in the pollution below it.

2 Claims, 4 Drawing Figures

DEVICE AND METHOD FOR THE RECLAMATION OF POLLUTED LAND AREAS

BACKGROUND OF THE INVENTION

There exist in the U.S.A. and elsewhere numerous areas where hazardous chemical and other wastes have been deposited, which render the area and its surround unsightly, uninhabitable and dangerous to human, animal and plant life, and which causes dangerous seepage into the ground water. Often such areas are polluted lakes or marshes which are expensive to drain and there is no place to put the solid and liquid pollutants.

It is an object of this invention to provide a simple low cost and efficacious device and method of reclaiming such areas.

IN THE FIGURES

DESCRIPTION OF THE INVENTION

Figure 1:
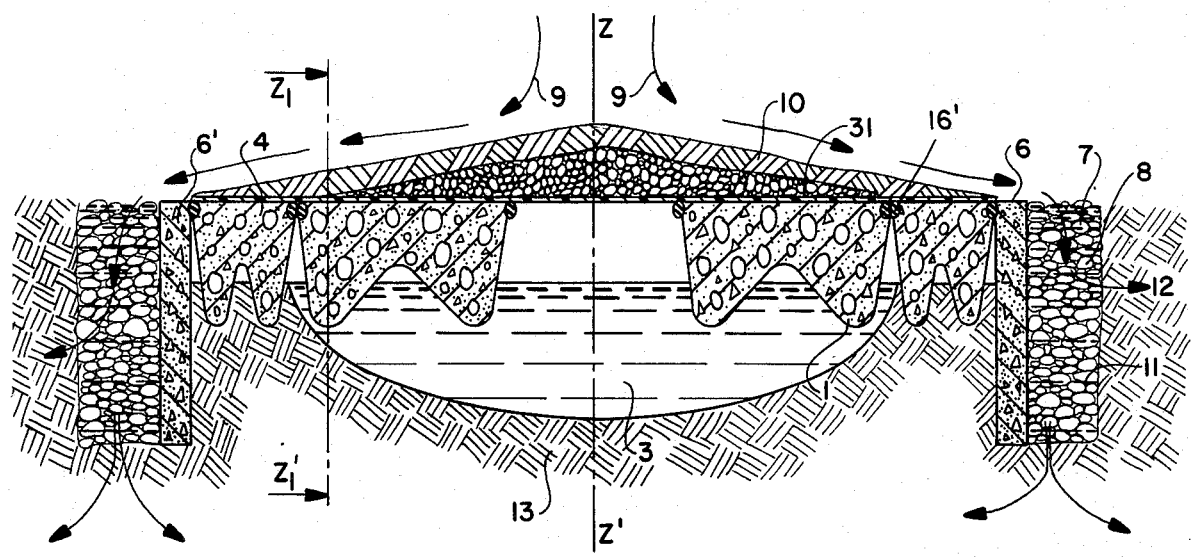
FIG. 1 shows a section of polluted land area, showing the device and construction method of this invention.

The devices and method of this invention utilize modules, which are known by the trademark Rectech TM. A Rectech TM module comprises a low density solid or hollow boat 1 of any suitable shape, one of which is shown in FIGS. (1) and (2). The modules 1, 1', 1" are prefabricated of low density concrete, which may be a foam, or contain voids 2, causing the modules to have a density $d \lesssim 0.5$ so as to cause the boat 1 to float on the polluted lake or marsh 3. The modules 1, 1', 1" are placed side by side, in effect filling over the entire area, and extending just beyond the edge of the polluted area, where they may be dug in on solid land, as at 4 and 5. A concrete retaining wall 6, 6' is constructed just beyond the perimeter of the central polluted area 3, extending for a suitable depth, for example 10 to 100 meters.

Surrounding the retaining wall 6, 6' there is a circular moat 7, which may be filled with gravel 8. Rainwater 9 flows down the sloped surface 10 of the top soil, which forms a low hill from the center line Z, Z' of the covered area.

The rainwater flows into the moat 7, producing an amount of clean water 11 surrounding the polluted area 3, but not in contact with it. The water 11 exerts a radial pressure, which outwardly, provides a clean water table to the surround area, and inwardly blocks the polluted water table 13 under the polluted area 3, from mixing or spreading to the surround area.

In FIG. 1 there is shown the compression gaskets 15, 16 parallel to the OX axis and compression gaskets 15', 16', . . . parallel to the OY axis.

Figure 2:
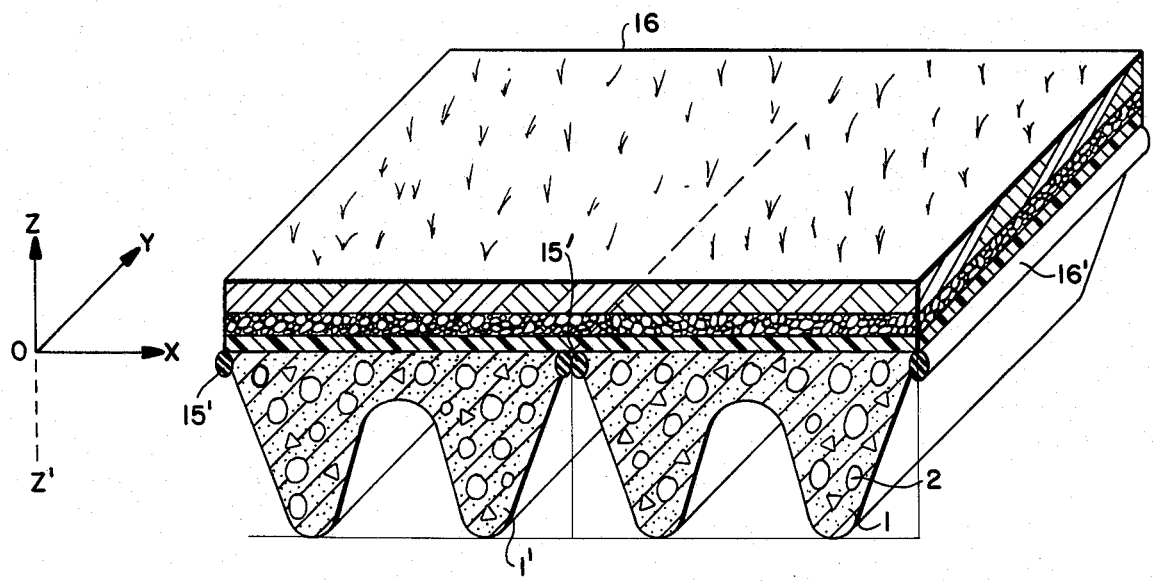
FIG. 2 shows a section in perspective of the device/modules according to this invention.

In FIG. 2 there is shown a detailed cross section of the Rechtech TM modules. They abut at edges 15, 16 at a rubber gasket that seals the upper surface from the polluted material under the modules. The modules are shaped to displace the liquid or marshy surface underneath, thus floating on that surface. The surfaces 31 of the modules are levelled by adjusting the height of the modules by varying their buoyancy in known manner, or if they are placed on solid ground, by earth moving equipment.

Figure 4:
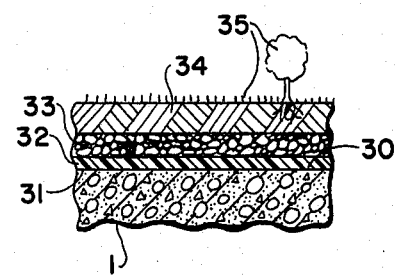
FIG. 4 shows a detailed cutaway sectional view through the module with the covering layers including landscaping.

FIG. 4 shows a detailed magnified view of a section through the module and the landscaping overlaid thereon, taken on a cut through the $Z_1Z_1'$ axis shown in FIG. 1. The level surface 31 of the module 1 is covered with a plastic sealant such as a polypropylene sheet 32; then with a layer of pebbles or gravel 33, then with topsoil 34, with suitable vegetation 35 above.

Figure 3:
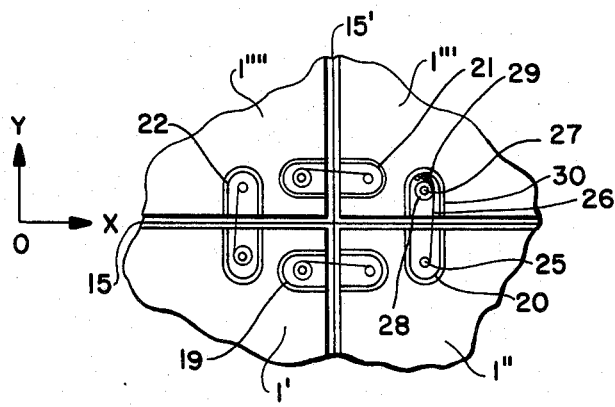
FIG. 3 shows a top view of the modules with fastening means.

FIG. 3 shows a top view of adjacent modules with an example of a fastening means to hold the modules together and comprises the gasket seal between them. The fastening means illustrated in the FIGURE comprises facing areas 19 inset into the upper surfaces of adjacent modules 1' and 1", similar facing areas 20 for modules 1" and 1'''; 21 for 1''' and 1''''; and 22 for 1'''' and 1'. Each fastening device comprises a stanchion such as 25 supported in 1", a stainless steel wire or chain 26, a pulley 28 around which to wind the wire, and a ratchet 29. The pulley is turned by a large wrench or other device to bring modules 1" and 1''' together and to compress the gasket 15'. Similarly, all the four tension devices are activated to bring the 4 modules 1', 1", 1''', 1'''' together and compress the gaskets 15 and 15', where they join to seal the surface from the underlying pollutants. Flat plates 30 are then dropped over the fastening means, leaving a flat smooth top surface, which serves as a base for the overlying layers.

The modules may be held together in a rigid cross bracing frame; using for example inset "I" beams bolted to the upper surfaces of the modules; and again, covered with plates to provide a smooth surface. In this manner all the surfaces are caused to align with a common plane.

Various modifications may be made of this invention without departing from the scope of this disclosure.

What I wish to claim is:

1. In a system for the reclamation of polluted areas, an interior polluted area, an exterior nonpolluted area surrounding said polluted area, a plurality of load-bearing modules, each of said modules having voids with average low density capable of floating on water, said modules having a substantially stable top flat surface, said modules being placed side by side abutting each other over the said polluted area, a rim around each of the said modules, gaskets mounted on each of the said rims, means on the said modules to draw the said modules together horizontally to compress said gaskets and form seals between said modules, a retaining wall around said polluted area, an annular moat around the said wall, said moat being filled with gravel and clean water, the said water in said moat sealing the polluted area from the exterior nonpolluted area, a film impervious to water and gas over the said top surface of the the said modules, and a sloping pebble and earth fill over the said film, whereby the pollutants are contained within the said polluted area.

2. A method of reclaiming a polluted area surrounded by a nonpolluted area, comprising covering the said polluted area with floating load-bearing modules, each said modules having a rim and a gasket thereon, compressing said gaskets together to seal in the pollutants, covering said modules on the top surface thereof with a sheet impervious to water and gas, placing a top layer of gravel, top-soil and vegetation on said top surface; surrounding said polluted area with a concrete wall sunk into the ground, providing an annular moat around said wall filled with gravel and clean water, providing clean water to said moat from rain-water runoff, thereby sealing said polluted area from the said surrounding nonpolluted area.

* * * * *